Figure 1:
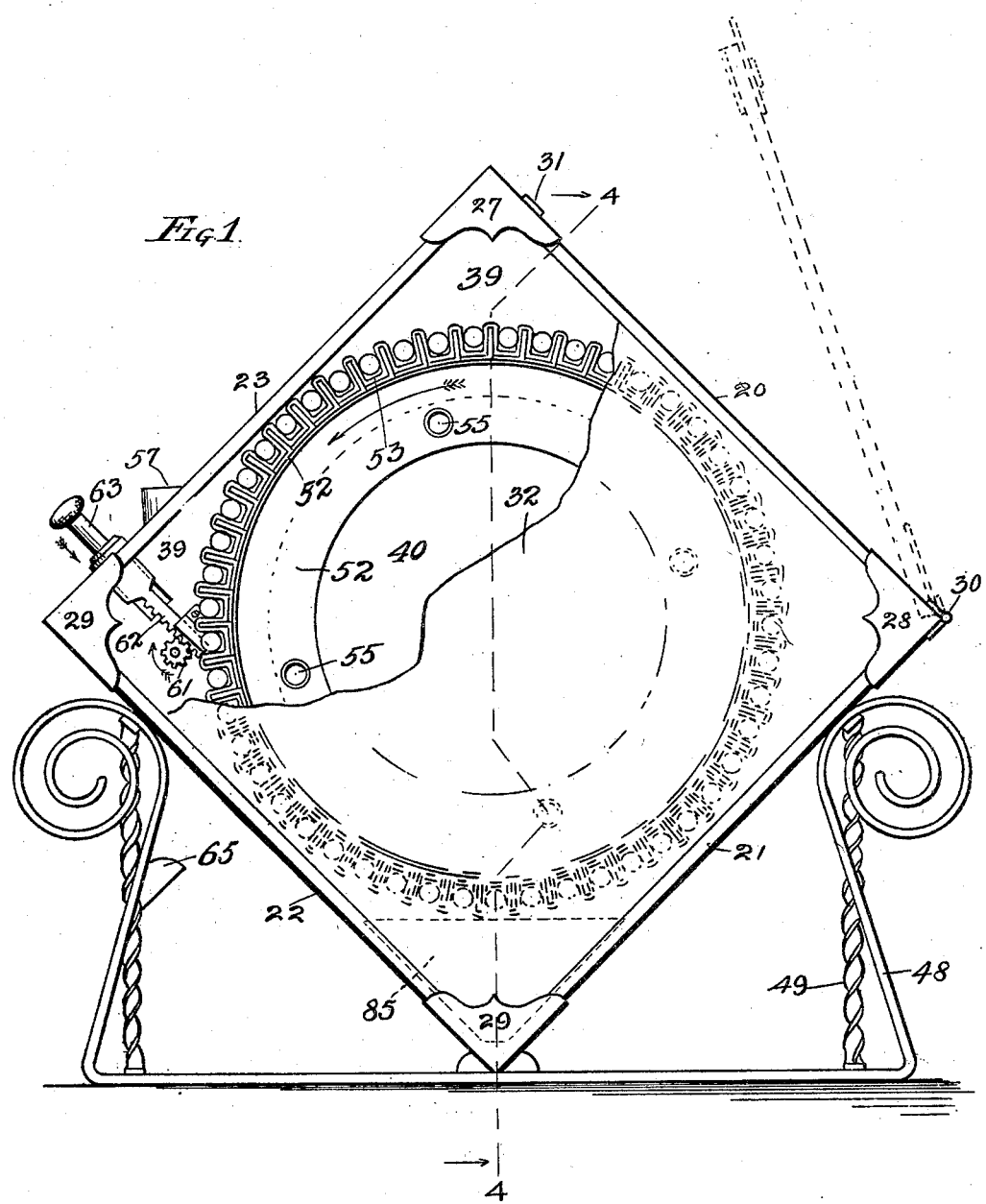

No. 705,005. Patented July 15, 1902.
E. A. WILCOX.
VENDING MACHINE.
(Application filed Oct. 18, 1901.)
(No Model.) 8 Sheets—Sheet 1.

WITNESSES:
F. B. Townsend
N. M. Munday

INVENTOR.
Elmer A. Wilcox
BY
Munday, Evarts & Adcock,
ATTORNEYS.

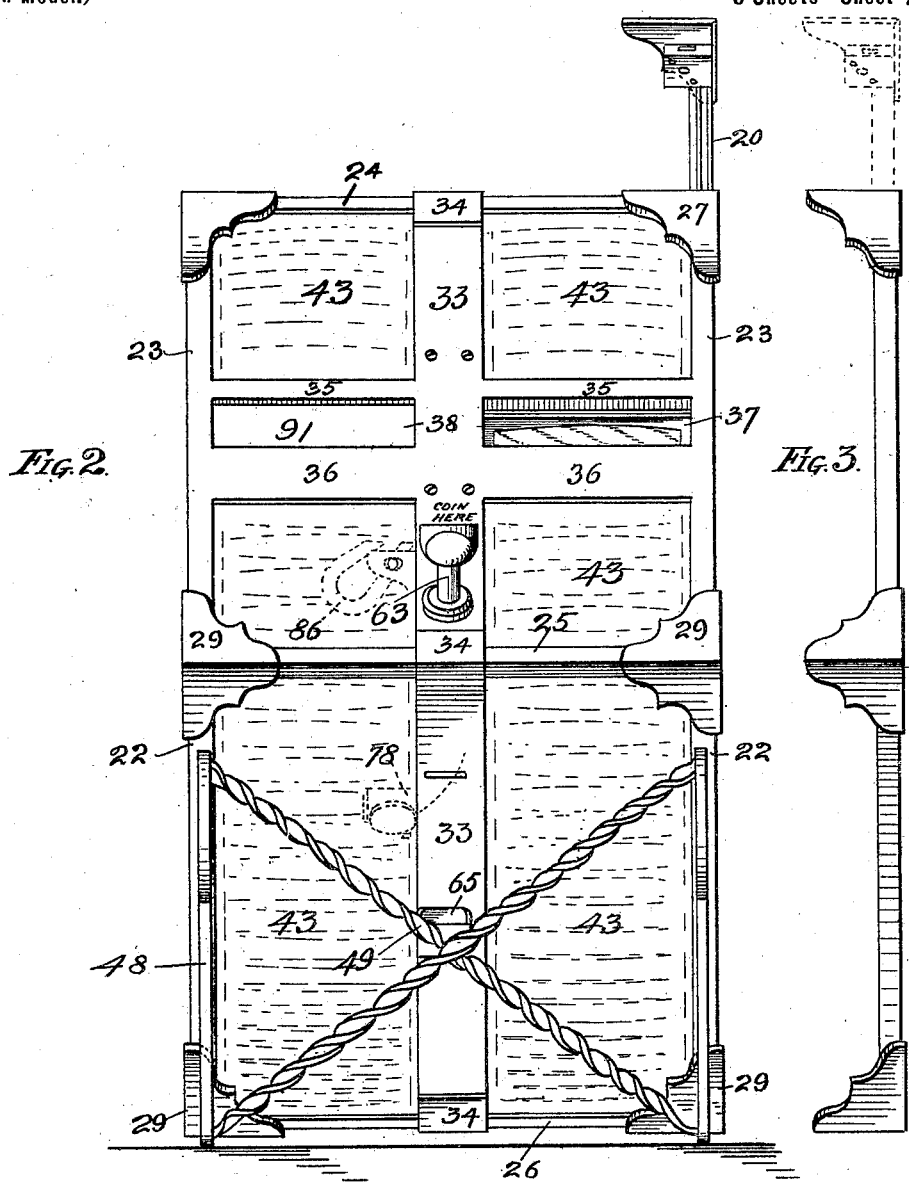

No. 705,005. Patented July 15, 1902.
E. A. WILCOX.
VENDING MACHINE.
(Application filed Oct. 18, 1901.)
(No Model.) 8 Sheets—Sheet 3.

WITNESSES:
F. B. Townsend
N. W. Munday

INVENTOR.
Elmer A. Wilcox
BY Munday, Everts & Adcock
ATTORNEYS

No. 705,005. Patented July 15, 1902.
E. A. WILCOX.
VENDING MACHINE.
(Application filed Oct. 18, 1901.)
(No Model.) 8 Sheets—Sheet 5.

WITNESSES:

INVENTOR.
Elmer A. Wilcox
BY
ATTORNEYS

No. 705,005. Patented July 15, 1902.
E. A. WILCOX.
VENDING MACHINE.
(Application filed Oct. 18, 1901.)
(No Model.) 8 Sheets—Sheet 6.
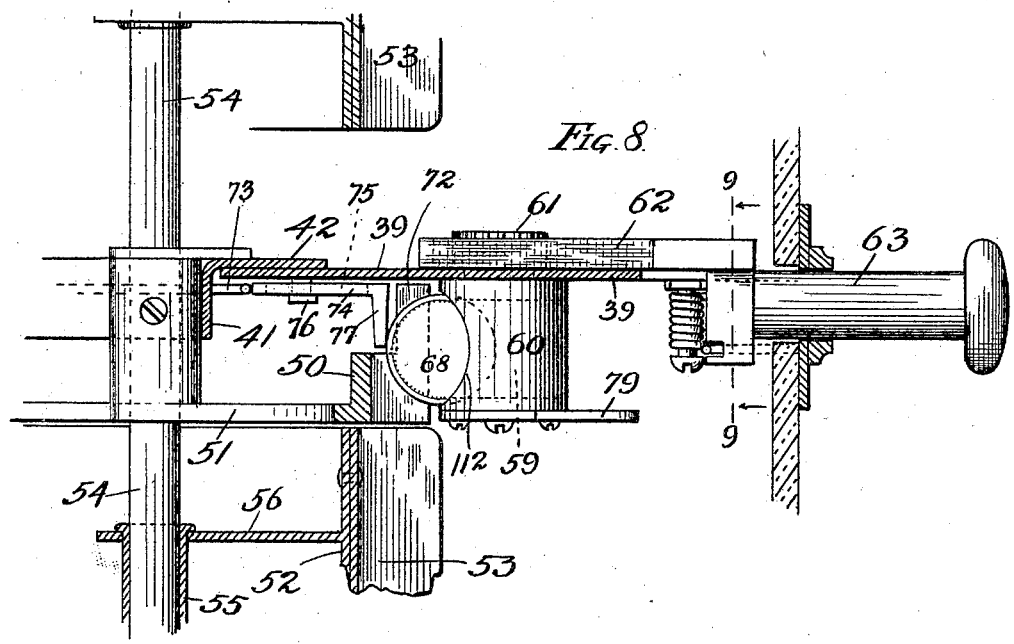
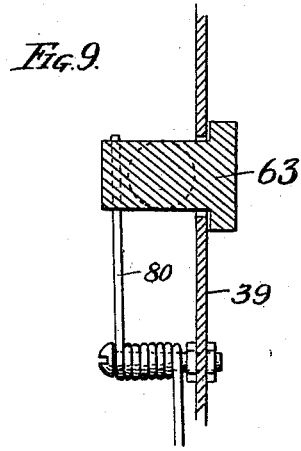
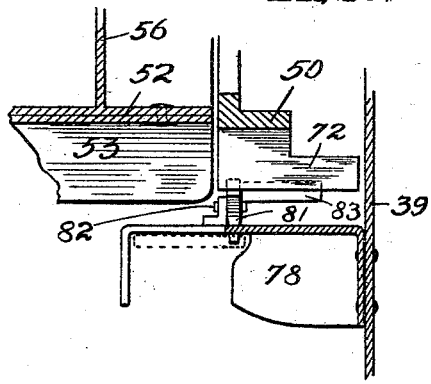
WITNESSES:
F. B. Townsend
A. W. Munday
INVENTOR.
Elmer A. Wilcox
BY Munday, Evarts & Adcock.
ATTORNEYS
THE NORRIS PETERS CO., PHOTO-LITHO., WASHINGTON, D. C.

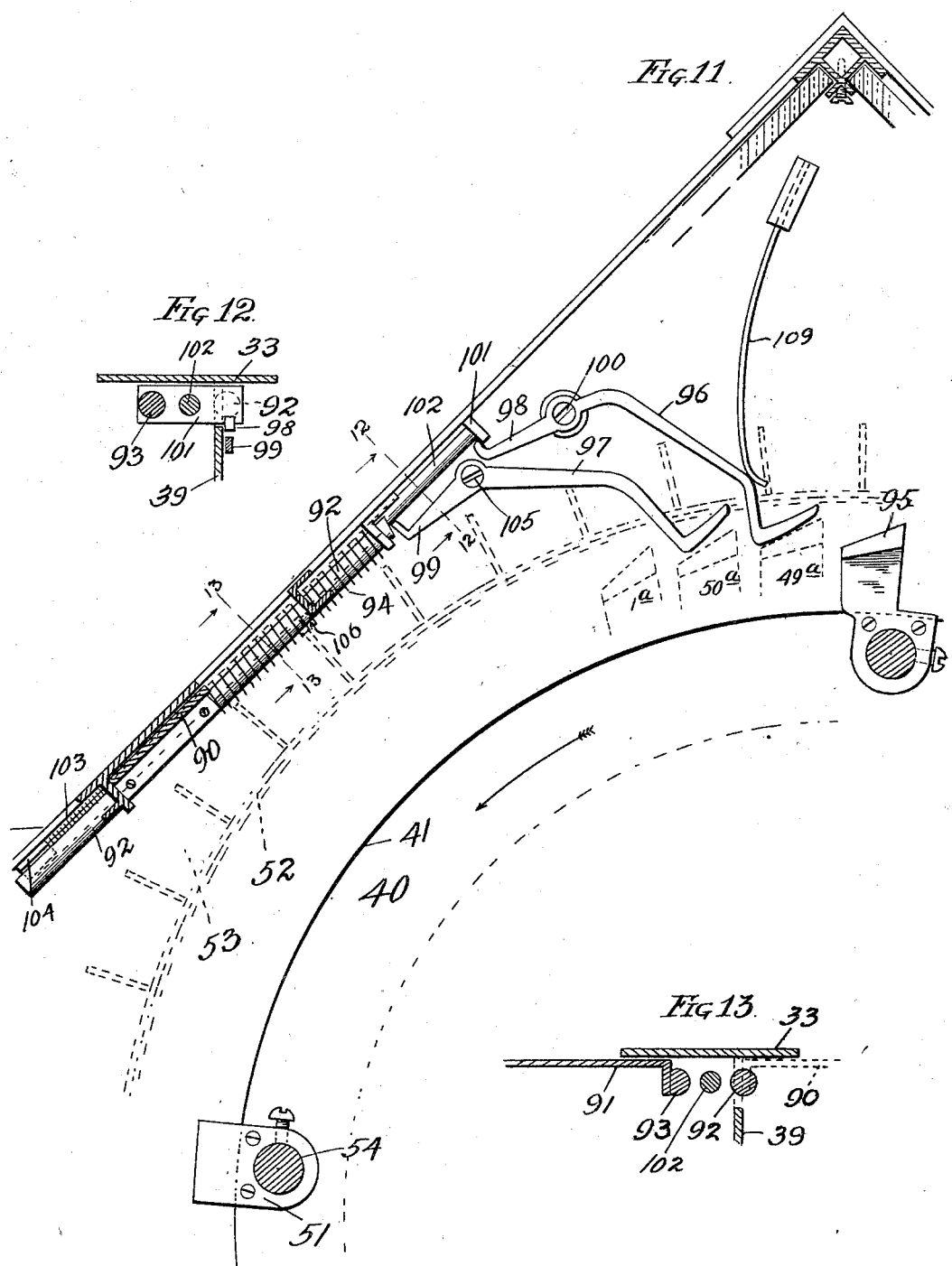

No. 705,005.  
E. A. WILCOX.  
VENDING MACHINE.  
(Application filed Oct. 18, 1901.)
Patented July 15, 1902.
(No Model.)  
8 Sheets—Sheet 8.
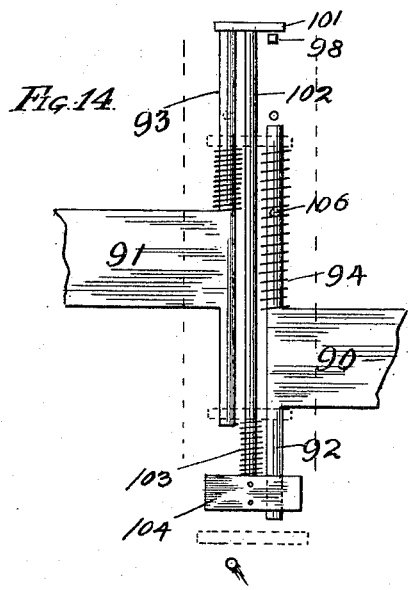
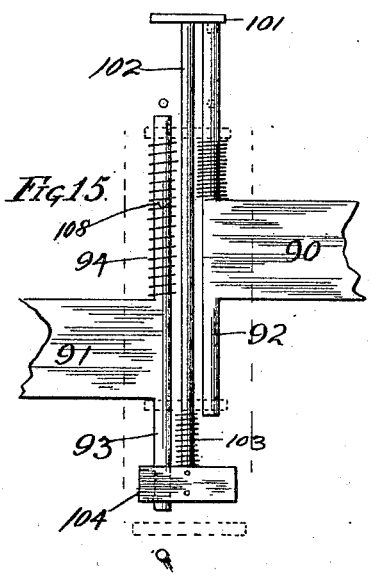
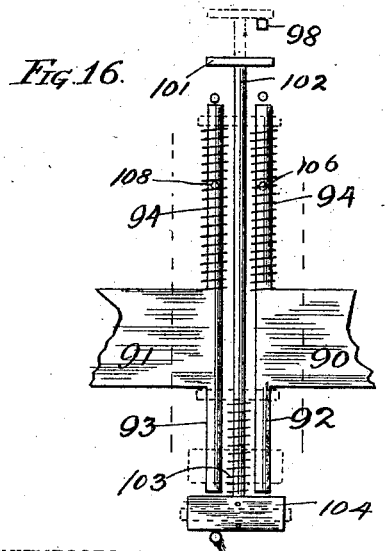
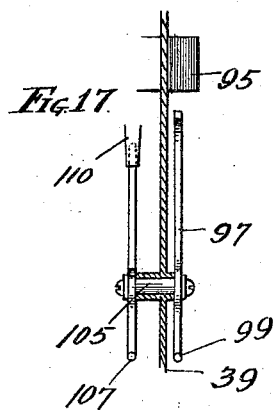
WITNESSES:  
INVENTOR.  
Elmer A. Wilcox.  
BY  
ATTORNEYS
THE NORRIS PETERS CO., PHOTO-LITHO., WASHINGTON, D. C.

UNITED STATES PATENT OFFICE.

ELMER A. WILCOX, OF CHICAGO, ILLINOIS, ASSIGNOR, BY DIRECT AND MESNE ASSIGNMENTS, TO STANDARD VENDING COMPANY, OF CHICAGO, ILLINOIS, A CORPORATION OF ILLINOIS.

VENDING-MACHINE.

SPECIFICATION forming part of Letters Patent No. 705,005, dated July 15, 1902.

Application filed October 18, 1901. Serial No. 79,055. (No model.)

*To all whom it may concern:*

Be it known that I, ELMER A. WILCOX, a citizen of the United States, residing in Chicago, in the county of Cook and State of Illinois, have invented a new and useful Improvement in Vending-Machines, of which the following is a specification.

I have already filed an application, Serial No. 73,280, of series of 1900, on cigar-vending machine, in which the cigars are placed in pockets formed upon the surface of a movable holder and are brought successively to a delivery-opening, where they are accessible to the purchaser. The present invention is an improvement upon the machine of said application and is intended to embody the invention of said application in a very practicable, attractive, and desirable form.

In the present invention instead of a single pocketed drum or wheel I prefer to employ two drums, thus doubling the capacity of the machine, and to so construct the operating mechanism as to secure the complete exhaustion or sale of all the cigars in one drum before exposing those of the other drum for sale, and the mechanism is adapted to automatically open the delivery-window of either drum as soon as the other drum is sold out. Should both drums be sold out, the coin-chute is automatically closed, so that no one can insert a coin and get nothing for it.

The invention relates largely to the construction of the coin-controlling mechanism and to the device whereby the automatic opening of the delivery-windows is secured; but it also embraces numerous other features of the machine, all of which are fully set forth below and pointed out in the claims.

Figure 4:
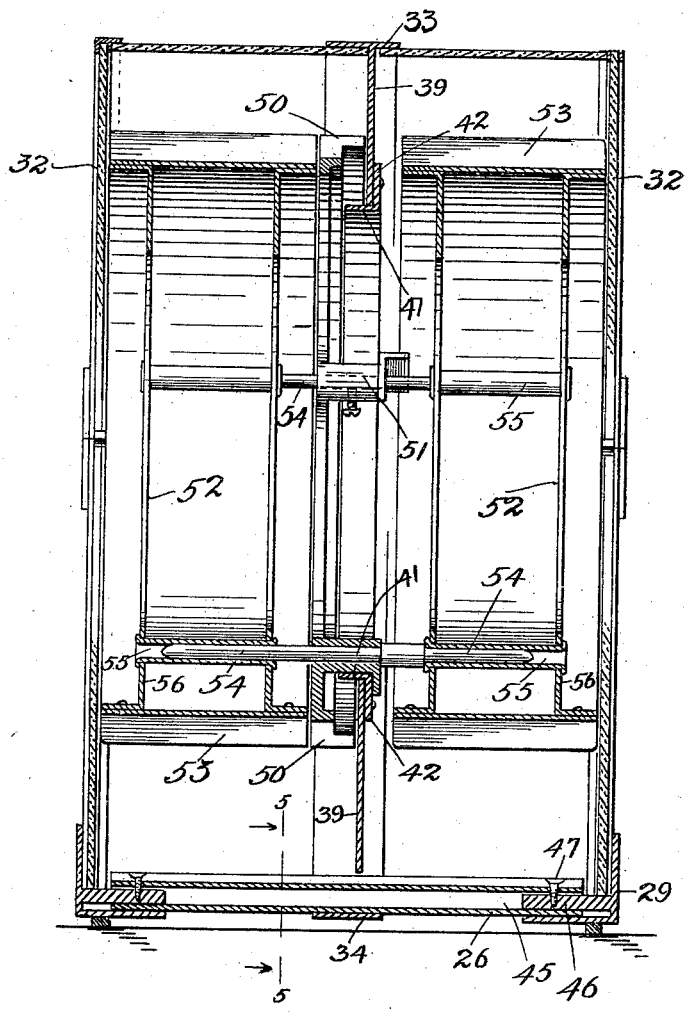
Figure 5:
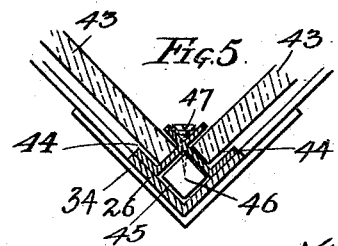
Figure 6:
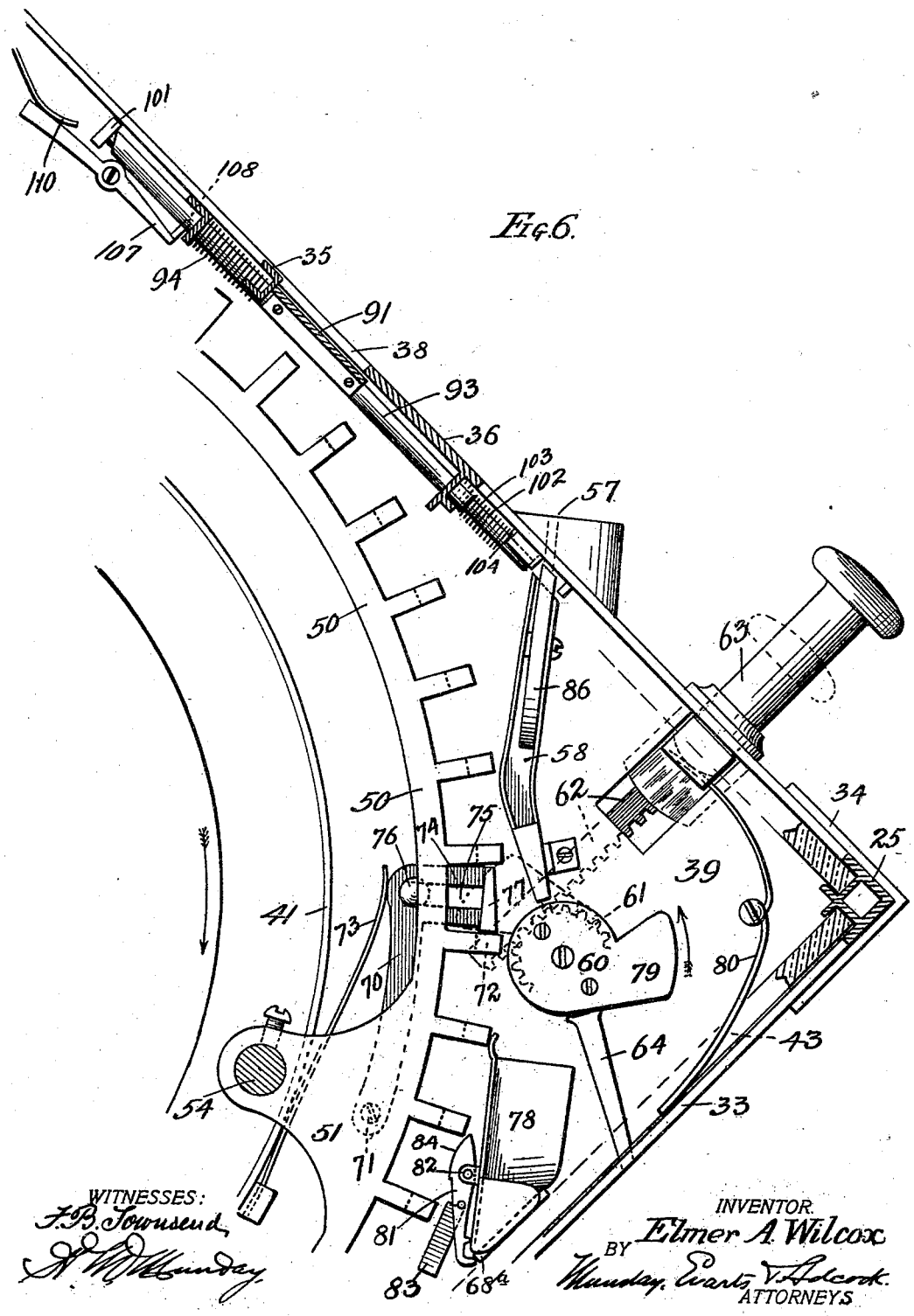
Figure 7:
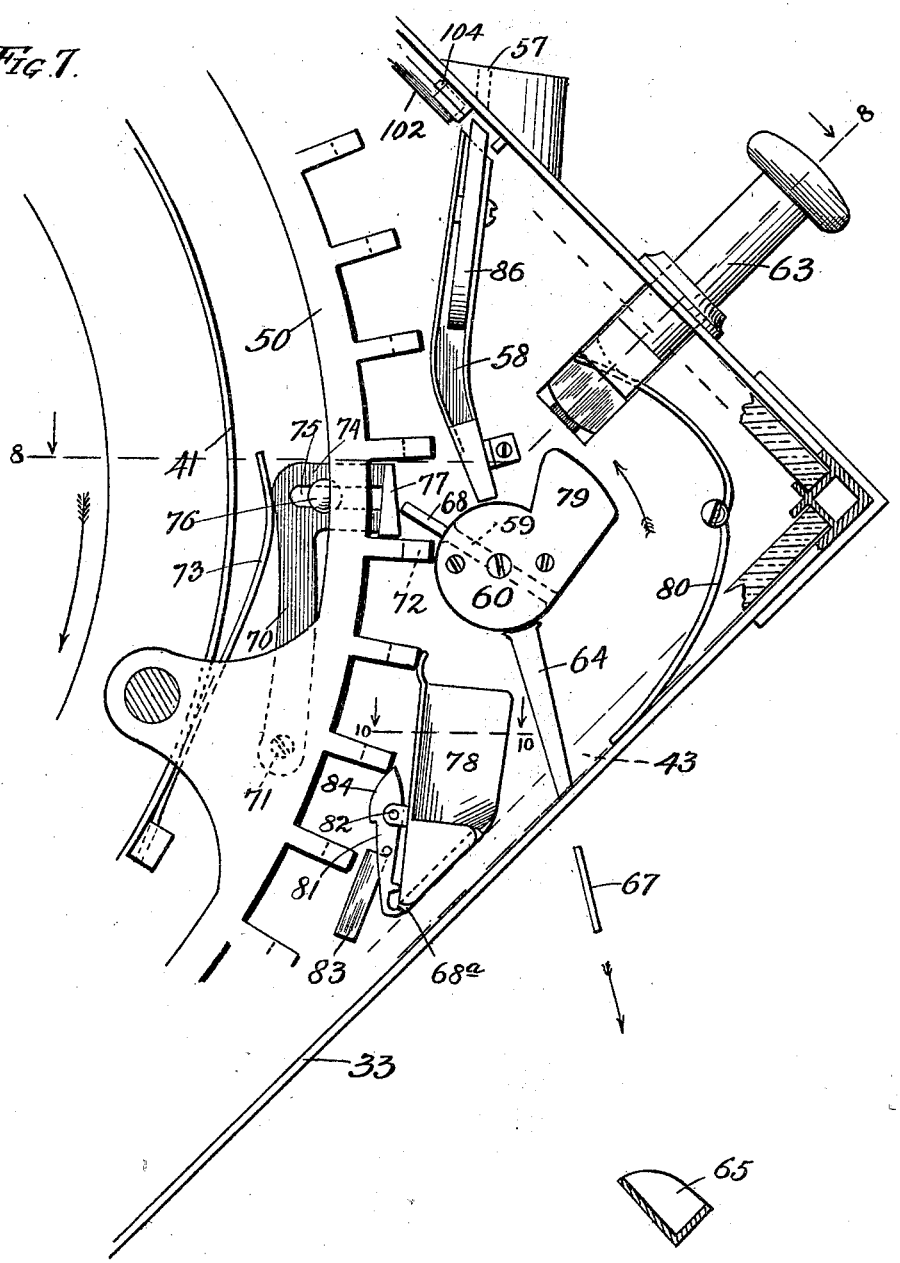

In the accompanying drawings, forming a part of this specification, I show at Figure 1 a side elevation of my invention, partly broken away. Fig. 2 is a front elevation. Fig. 3 is a detail front elevation of one of the end frames of the casing. Fig. 4 is a section on the line 4 4 of Fig. 1. Fig. 5 is a section on the line 5 5 of Fig. 4. Fig. 6 is a partial central vertical section. Fig. 7 is a view similar to Fig. 6, showing the parts in different positions. Fig. 8 is a section on the line 8 8 of Fig. 7. Fig. 9 is a section on the line 9 9 of Fig. 8. Fig. 10 is a section on the line 10 10 of Fig. 7. Fig. 11 is a partial central vertical section showing the shutter-controlling mechanism. Figs. 12 and 13 are sections on the lines 12 12 and 13 13, respectively, of Fig. 11. Figs. 14, 15, and 16 are elevations of the shutters for closing the delivery-windows, showing them in three different positions. Fig. 17 is a section showing the pivoting of the shutter-dogs.

The casing, like that of my previous application, is composed of glass and a metallic frame in order to render both the cigars and revenue-stamps upon the cigar-package visible from the outside of the machine. The end frames consist of the pieces 20, 21, 22, and 23 and are connected at the four angles or corners of the casing by cross-pieces, of which three are shown at 24, 25, and 26. The end and cross pieces are all united together by three-sided corner-pieces or unions 27, 28, and 29, and of these those marked 29 are in one piece and secure all the frame members coming together at their respective corners, while those marked 28 are made in three parts to permit the two horizontal members thereof to be hinged together, as shown at 30, and serve as a hinge to end frame-pieces 20, and those marked 27 are made in two parts in order to permit one of the horizontal members of each thereof—to wit, the member attached to the frame-piece 20—to be moved with the frame-piece when the latter is swung on its hinge, as indicated in Figs. 1 and 2. The upper end of this swinging piece 20 is desirably locked in its normal position, and the rosette of a lock for that purpose is shown at 31. The end frames each hold a glass pane or panel 32, preferably in one piece and of a size coextensive with the frame.

Centrally between the two end frames the casing is divided into two sections or parts by flat metal bands 33, united at the corners of the casing by straps 34, soldered to the ends of the bands and constituting with them a four-sided central frame. The straps preferably overlap the corner-pieces 25, 26, and 27, so that the central frame will be rigid with the main frame; but the central frame is also united to the frame-pieces 23 by horizontal braces 35 and 36, between which are formed the windows 37 and 38, through which the purchasers obtain access to the cigars bought by them. The bands 33 are secured to an interior vertical plate or web 39, in which is cut a large central opening 40. The edge of the web around this opening is covered by a ring 41, secured in place by means of its flange 42, which is riveted to the web. The ring 41 forms the support or bearing for the cigar-carrying drum, as presently to be described.

Between the bars 33 and the end frames the spaces are filled with glass 43, so that the casing is rendered complete and entirely covers and protects the mechanism of the machine without, however, concealing either the cigars or the stamps on the packages in which they are supplied to the machine. At the corners the joints between the end frames and the horizontal members are provided with channels 44 for the glass 43; also, with square recesses 45, in which are inserted retaining-pieces 46, attached to the unions and adapted to receive screws 47. The member 26 may be made in one or two pieces, as preferred, the latter construction being the one illustrated.

The casing is preferably supported in a cornerwise position, as shown, and for this purpose a light frame, consisting of two end pieces 48, having their ends bent up as shown, and connected by pairs of angling-braces 49, may be employed.

At one side of the web 39 is a toothed rim 50, the teeth of which are spaced to correspond with the pockets of the drums. It is provided with a series of inwardly-projecting brackets 51, which are U-shaped on one side to permit them to fit around the ring 41, and the brackets are also movably fitted to and slide along the interior of the ring, so that the ring forms a support or bearing for the rim 50 and the parts carried by it, permitting them to rotate, while at the same time the brackets prevent all lateral movements.

The cigar-holding drums are shown at 52. They are provided with exterior pockets 53, which are successively brought into register with the delivery-window 37 or 38 and are supported with freedom to rotate by means of the brackets 51, already mentioned, and pins 54, passing transversely through the brackets and extending far enough on either side thereof to enable them to enter the tubes 55, secured in the flanges 56 on the inside of the drums. The drums are readily removable from and as readily positioned on these pins by an endwise movement, and it is to permit the removal and positioning that the end frame-pieces 20 are hinged at their lower ends and locked at the top, as by unlocking and swinging said pieces 20 back the end glass panes 32 are rendered removable, giving full access to the drums. This is a great convenience in loading the drums with cigars.

The rotary movement of the drum is caused by the coin through the medium of appropriate mechanism, as follows: The coin inserted at the slot 57 falls through the chute 58 into the slot 59 in an oscillating block 60, pivotally supported in the web 39. Rigid with block 60 is a pinion 61, meshing with a rack 62, formed on a push-bar 63, extending to the outside of the case, so it may be operated by the purchaser after he has deposited his coin. The coin-slot of block 60 is cut through the block, so that the coins inferior in diameter to the coin by which the machine is designed to be operated will pass entirely through the block and pass out through the supplemental chute 64 into an exterior receptacle or pan 65. A coin 67 is shown as being rejected by the machine in Fig. 7, having passed through the block and chute 64 on its way to the receptacle 65, located outside the casing and in front of the purchaser and where he can recover it. By this construction any person who may insert a coin in the machine which is less than the proper size—as, for instance, a dime or a penny, where a nickel is required—receives back his coin, although that coin will not serve to operate the drums or secure the delivery of a cigar.

If the coin is of proper size, it will be unable to pass through the block 60 and fall out after the described manner of an inferior-sized coin, but, on the contrary, it will be arrested in the slot 59 with a half or more of its body projecting, as shown at Figs. 7 and 8. Supposing a coin of proper size—as, for instance, the one shown at 68—to be inserted and to have been arrested by slot 59, the purchaser operates the push-bar 63, and thereby turns the block 60 so as to carry the projecting portion of the coin into the space between the teeth of rim 50. The rim is normally locked against rotation by a latch 70, pivoted at 71 to the web 39 and pressed into engagement with the teeth 72 of the rim by a spring 73. The teeth of the rim project laterally from the same, as plainly shown at Figs. 8 and 10, and are cut away on the under side of the projecting part, so that the part projecting is only about half as high radially as the part over the rim. The latch at its acting end is provided with a right-angled projection 74, in which is a slot 75 to receive a guide-pin 76, secured to the web 39. This pin limits the movement given the latch by the spring. The end of the projection 74 carries a vertical stop or contact-piece 77 with an inclined face, as shown, adapted to enter between the lateral projecting parts of the teeth 72, and thus lock the rim against rotary movement in either direction, and this contact-piece always enters between the teeth which are opposite the coin when arrested by the slot 59, so that when the coin-block is rotated the coin will be carried against said inclined face of the contact-piece and force it back sufficiently, as seen at Fig. 8, to release the rim and permit it to be turned by the continued movement of the coin, which is thereby carried against the lower one of the rim-teeth. The latch requires to be moved back in this manner only far enough to carry it into the open space formed by the cut-away portions of the teeth, and of course it returns to its normal position (shown at Fig. 6) as soon as the rim has been moved one tooth-space. It is shown at Fig. 7 as having been pressed back by the coin far enough to release the rim without having given any movement to the rim; but it is evident from that figure that the rim must thereafter move in obedience to the coin because the latter is carried by the coin-block far enough to insure its fall by gravity from the block into the chute 78, and the push-bar is adapted to give that amount of rotation to the coin-block. The coin-block is cut on one side of the slot therein, as shown at 112, Fig. 8, to render the escape of the coin from the block easy and certain. The coin-block is also preferably provided with a projecting portion 79 at one end, adapted to enter between the teeth 72 and act as a stop-motion to the rim. This stop may be formed of sheet metal and suitably attached to the end of the block. It enters the teeth at each operation of the block and insures exactness in the motions given the rim by the coin, and should the latter fail to carry the rim the required extent this projection 79 will complete the movement. It also acts to prevent any overthrow in the movements of the rim. It retreats, of course, after each actuation of the rim with the return rotation of the block, which is caused by the spring 80 acting on the push-bar.

At the bottom of chute 78 I place a coin-arrester 81. It is pivoted at 82 and provided with a weight 83 at its lower end in order to insure its being in position after it has released one coin to engage the next one. It is intended merely to stop the coin, as shown at 68$^a$, Fig. 7, so that it can be seen from the outside of the case through the transparent pane 43. The arrester is shaped as at 84, so that the teeth 72 act upon it as they pass and lift its lower end and allow the coin to escape and slide down into a coin pan or box 85, located in the bottom corner of the casing. A magnet 86 may be located adjacent to the chute 58 to intercept spurious coin.

Shutters 90 and 91 are provided at the delivery-openings 37 and 38 and are attached to sliding rods 92 and 93, respectively. Both rods are provided with downwardly-acting springs 94, which are compressed when the shutters are in their upper or closed positions, and consequently are ready for instantly opening the shutters when the latter are released from the devices by which they are held closed. When the machine is in use, one of these shutters is always open and when all the cigars have been sold from either drum the other shutter opens automatically, so that both will then be open and remain so until the attendant recharges the exhausted drum and closes the shutter of that drum. Of course both sides may be sold out before recharging, and when this occurs the coin-slot is closed automatically at the time the last cigar is delivered. The mechanism controlling the shutters and coin-slot will now be described.

Attached to one of the brackets 51, traveling with the rim 50, is an inclined cam 95, which is adapted to engage the long arms 96 and 97 of pivoted catches 98 and 99. The arm 96 is pivoted at 100 to the web-plate 39, and its catch 98 engages a cross bar or head 101 on the sliding rod 102, located between the shutter-rods, having a depressing-spring 103 and carrying a gate 104 at its lower end, adapted to enter and close the coin-slot when the rod 102 is allowed to yield to the spring. The arm 97 is mounted on one end of a shaft 105, passing through the web 39, and its catch 99 enters an opening or recess 106 in the shutter-rod 92, and thereby locks said rod and its shutter in their upper or closing position. The rod 93 is locked in its upper position by another catch 107, secured on the opposite end of shaft 105 and located at the opposite side of web 39, such catch entering a recess 108, formed in rod 93. The rods 92 and 93 are each adapted to hold rod 102 in its upper or non-setting position by their setting under the head 101, as will be plainly understood from Figs. 14 to 16, so that rod 102 cannot descend unless both rods 92 and 93 are lowered, and consequently when either of the shutter-rods is up the actuations of the catch 98 by the cam will be idle; but if both shutter-rods are down the withdrawal of catch 98 causes the immediate descent of rod 102 and the closing of the coin-slot.

In Fig. 11 the indicators 1$^a$, 50$^a$, and 49$^a$ indicate the position of the cam 95 at different operations. Supposing the drums each to have fifty spaces for cigars, when the cam reaches the position given in full lines in said figure forty-eight cigars will have been sold. When it moves to the position 49$^a$, the forty-ninth cigar will be delivered. When it moves from 49$^a$ to 50$^a$, the fiftieth or last cigar in the drum will be disposed of. At its next actuation carrying it to 1$^a$ the arm 97 will be actuated, so that the shutter of the other drum will be lowered and the purchaser allowed to take his cigar from the other drum. The cam now continues on its course until it again stands at 49$^a$, at which time, if the exhausted drum has not been recharged meanwhile, there will be but one cigar in the machine and both shutters will be down. The purchaser of the last cigar when he actuates the push-bar and rotates the drum also causes an actuation of arm 96, and thereby releases rod 102, so that the coin-slot is closed and no more money can be inserted. If the drum first exhausted is recharged before the second drum is exhausted, as it should be, preferably, the shutter of the first drum will be up, because when he recharges the drum the attendant raises the shutter of that drum, and consequently it will be seen that the slot-controlling rod 102 will never be permitted to fall unless both drums are entirely exhausted of cigars.

Figs. 14 and 15 show the relative positions of the shutters and rod 102 when one drum is full and sales are being made from the other, and Fig. 16 shows the same parts when both drums are exhausted. Springs 109 and 110 are employed to return the catches 98, 99, and 107 after they have been operated by cam 95, and any suitable means may be employed to limit the motion of rod 102.

In practice when the machine is first filled and also when it has been recharged after the exhaustion of both drums the attendant should leave one shutter down and take out the first cigar exposed. When recharging in cases where only one drum has been exhausted of its supply, the attendant has only to raise the shutter of the drum he is recharging without removing any cigar. This recharging of an exhausted drum can take place at any time after the first cigar has been sold from the other drum.

The block 60 is round exteriorly and is thereby enabled to hold any coin in the chute which may have been deposited at a time when the slot of the block was not in register with the chute without clogging or in any way affecting the working of the machine, the coin simply riding on the block until the slot therein comes into register.

I claim—

1. The merchandise-vending machine having two movable pocketed carriers for the merchandise, each with its own delivery window or opening, coin mechanism controlling the movements of the carriers, independent shutters for said openings, and means whereby when one carrier is exhausted, the shutter of the other carrier will be opened, substantially as specified.

2. The merchandise-vending machine having two pocketed carriers for the merchandise movable by the purchaser, and each having its own delivery window or opening, coin mechanism controlling the movements of the carriers, independent shutters for said openings, and means whereby when one carrier is exhausted, the shutter of the other carrier will be opened, substantially as specified.

3. The cigar-vending machine having two movable cigar-holding devices, each with its own delivery-opening, coin mechanism controlling the movements of said devices, shutters for closing said delivery-openings, and means whereby said devices may cause the opening of either shutter, substantially as specified.

4. The cigar-vending machine having a coin mechanism, two movable cigar-holding devices mechanically connected so that they move together and each provided with its own delivery-opening, shutters for closing said openings, and means whereby said devices may, whenever the cigars are all sold from one device, cause the opening of the shutter of the other device, substantially as specified.

5. The coin-controlled cigar-vending machine, having two movable cigar-holding devices each with its own delivery-opening, shutters for closing said delivery-openings, and means whereby said cigar-holding devices may cause the opening of either of said shutters, substantially as specified.

6. The coin-controlled cigar-vending machine having two movable cigar-holding devices each with its own delivery-opening, shutters for closing said delivery-openings, springs for operating said shutters, means for holding the shutters in their closed positions, and means whereby said cigar-holding devices may cause the opening of either of said shutters, substantially as specified.

7. The merchandise-vending machine having two movable pocketed carriers for the merchandise, each with its own delivery window or opening, coin mechanism controlling the movements of the carriers, independent shutters for said openings, means whereby the carriers may cause the opening of either shutter, and means whereby the slot of the coin mechanism will be closed when all the merchandise is sold, substantially as specified.

8. The merchandise-vending machine having two movable pocketed carriers for the merchandise, each with its own delivery window or opening, coin mechanism controlling the movements of the carriers, independent shutters for said openings, and means whereby the slot of the coin mechanism will be closed when all the merchandise is sold, substantially as specified.

9. The vending-machine wherein are combined two rotatable merchandise-carriers, each having its own delivery-window, independent shutters controlling said windows, coin mechanism, and mechanism for controlling said shutters, the coin mechanism and the shutter mechanism being located in a plane between the carriers, substantially as specified.

10. The combination with the merchandise carriers or holders of a coin-controlled vending-machine, of a rotatable toothed wheel or rim 50 supporting said carriers, a surrounding casing having a separate merchandise-delivery window in front of each carrier, separate shutters for closing said windows, mechanism for controlling said shutters, and a cam carried by said rim and causing the operation of said shutter mechanism, substantially as specified.

11. The combination with the merchandise carriers or holders, of a rotatable toothed wheel or rim 50, supporting said carriers, mechanism for operating said rim, a surrounding casing having separate delivery-windows one in front of each carrier, spring-pressed shutters for closing said windows, mechanism for controlling said shutters, and a cam carried by said rim causing the operation of said shutter mechanism, substantially as specified.

12. The combination with the merchandise carriers or holders, of a rotatable toothed wheel or rim 50, supporting said carriers, mechanism embracing the deposited coin for operating said rim, a surrounding casing having a separate delivery-window in front of each carrier, spring-pressed shutters for closing said windows, mechanism for controlling said shutters, and a cam carried by said rim causing the operation of said shutter mechanism, substantially as specified.

13. The combination with the merchandise carriers or holders of a coin-controlled vending-machine, of a rotatable toothed wheel or rim 50, supporting said carriers, a surrounding casing having a window in front of each carrier, shutters for closing said windows, springs for opening said shutters, catches for holding the shutters closed, and a cam carried by said rim and causing the release of said catches, substantially as specified.

14. The combination in a vending-machine, of the shutters for closing the delivery-windows and the gate for closing the coin-slot, all mounted on sliding rods arranged parallel and close together, the rod of the gate having a top cross-bar engaged by the shutter-rods, springs on said rods, catches for holding the shutters closed and the gate open, and means for releasing said catches, substantially as specified.

15. The combination in a vending-machine, of two merchandise-carriers, each having its own delivery-window, coin mechanism for operating the carriers, shutters for said windows and a gate for the slot of the coin mechanism, parallel and adjacent rods supporting said shutters and gate, a controlling device for each rod, and means moving with the carriers for releasing said controlling devices, substantially as specified.

16. The combination in a vending-machine, of two merchandise-carriers, each having its own delivery-window, coin mechanism for operating the carriers, shutters for said windows and a gate for the slot of the coin mechanism, parallel and adjacent rods supporting said shutters and gate, said shutter-rods supporting the gate-rod when they are themselves raised, a catch for each rod, and means moving with the carriers for releasing said catches, substantially as specified.

17. The combination of the delivery-window shutters and their supporting-rods, with the coin-slot gate and the supporting-rod, and the catch by which the gate is controlled and the shutter-rods acting when in their raised positions to prevent the gate from closing, substantially as specified.

18. The combination with the delivery-window shutters and their supporting-rods, with the coin-slot gate, its supporting-rod, the catch by which the descent of the gate is controlled, and the cam releasing the catch, the shutter-rods also acting when in their raised positions to prevent any fall of the gate, substantially as specified.

19. A gate for closing the coin-slot, a spring for the gate, and a catch for holding the gate open, in combination with the shutter for closing the merchandise-delivery window, the catch controlling said shutter, and means for releasing both said catches, the gate-catch being operated in advance of the shutter-catch, whereby the coin-chute will always be closed when the merchandise is sold, substantially as specified.

ELMER A. WILCOX.

Witnesses:
EDW. S. EVARTS,
H. M. MUNDAY.